(12) United States Patent
Kirshon

(10) Patent No.: US 12,105,534 B1
(45) Date of Patent: Oct. 1, 2024

(54) MAINTAINING SAFETY OF REMOTELY OPERATED VEHICLES IN VARIABLE NETWORK CONDITIONS

(71) Applicant: Ottopia Technologies Ltd., Tel Aviv (IL)

(72) Inventor: Alexander Kirshon, Netanya (IL)

(73) Assignee: Ottopia Technologies Ltd., Tel Aviv (IL)

( * ) Notice: Subject to any disclaimer, the term of this patent is extended or adjusted under 35 U.S.C. 154(b) by 0 days.

(21) Appl. No.: 18/605,005

(22) Filed: Mar. 14, 2024

(51) Int. Cl.
  *G05D 1/617* (2024.01)
  *G05D 1/227* (2024.01)
  *G05D 109/10* (2024.01)
  *G05D 111/30* (2024.01)

(52) U.S. Cl.
  CPC ........... *G05D 1/617* (2024.01); *G05D 1/2274* (2024.01); *G05D 2109/10* (2024.01); *G05D 2111/32* (2024.01)

(58) Field of Classification Search
  None
  See application file for complete search history.

(56) References Cited

U.S. PATENT DOCUMENTS

| | | | |
|---|---|---|---|
| 9,947,224 B2 | 4/2018 | Fairfield et al. | |
| 10,321,320 B2 | 6/2019 | Raleigh | |
| 10,710,603 B2 | 7/2020 | Beaurepaire et al. | |
| 10,994,748 B2 | 5/2021 | Mortazavi et al. | |
| 11,215,986 B2 | 1/2022 | Chen et al. | |
| 11,231,709 B2 | 1/2022 | Chase et al. | |
| 11,268,826 B2 | 3/2022 | Sakurada | |
| 11,650,603 B2 | 5/2023 | Silver et al. | |
| 11,855,799 B1 | 12/2023 | Hartung et al. | |
| 2019/0354111 A1* | 11/2019 | Cheng | H04W 4/44 |
| 2020/0133266 A1 | 4/2020 | Raichelgauz et al. | |
| 2021/0186329 A1 | 6/2021 | Tran | |
| 2021/0234767 A1 | 7/2021 | Ricci et al. | |
| 2022/0332350 A1 | 10/2022 | Jha et al. | |
| 2022/0340145 A1* | 10/2022 | Stenneth | B60W 60/001 |
| 2023/0030446 A1* | 2/2023 | Lei | G05D 1/0022 |
| 2023/0211788 A1 | 7/2023 | Zhang et al. | |
| 2024/0036571 A1* | 2/2024 | Goldman | G05D 1/0038 |

* cited by examiner

*Primary Examiner* — Tamara L Weber
(74) *Attorney, Agent, or Firm* — M&B IP Analysts, LLC

(57) ABSTRACT

A system and method for maintaining safe remote vehicle operation. A method includes analyzing network conditions for a vehicle, wherein at least a portion of vehicle operations for the vehicle are performed based on remote instructions, wherein the remote instructions are sent by a device which is remote from the vehicle; determining at least one safety measure decision for the vehicle based on the analyzed network conditions, wherein the at least one safety measure decision includes a set of safety measure instructions to be sent to a safety system of the vehicle; and implementing the at least one safety measure decision with respect to the vehicle by sending the set of safety measure instructions to the safety system of the vehicle, wherein the safety system controls the vehicle operations based on the set of safety measure instructions.

27 Claims, 7 Drawing Sheets

MAINTAINING SAFETY OF REMOTELY OPERATED VEHICLES IN VARIABLE NETWORK CONDITIONS

TECHNICAL FIELD

The present disclosure relates generally to maintaining safety for connected vehicles, and more specifically to maintaining safety of connected vehicles based on network conditions.

BACKGROUND

Many modern vehicles possess some form of driving assistance systems such as lane assist, backup camera, and the like. These features may be certified to be safe for use on the road, and some can be configured for local operation (i.e., without vehicle connectivity). In some circumstances, driving assistance system activities can be overridden. For example, a lane assist system may exercise control over a steering system in order to guide the vehicle back in between lane markers, but a human operating a steering wheel may be able to override the lane assist system by exerting enough force to trigger an override mechanism.

At the same time, vehicles are increasingly becoming equipped with capabilities to allow for at least some degree of remote operation. Such capabilities may allow a remote operator to make certain decisions in the place of a driver located in the vehicle or onboard driving system.

These remote capabilities may be realized via connected vehicles. A connected vehicle is a vehicle including or otherwise being configured with equipment, applications, or systems which enable communications between the vehicle and other systems in order to receive instructions, commands, or other data. These communications may be utilized to provide support for the vehicle with respect to safety, efficiency, and/or mobility.

While remote operating systems may allow for more skilled drivers or for human override of assisted driving vehicle operations in cases where the local operator or autonomous driving system is incapable of safely navigating, remote operating systems are prone to challenges in navigating safely due to delays between capturing data onboard the vehicle and receipt of that data at a remote operating system. In other words, if appropriate decisions are not made promptly, remote operation may fail to improve safety.

Techniques for improving safety of remote operation of connected vehicles, and more specifically for improving safety of remotely operated vehicles in tandem with vehicle safety systems, are desirable.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for maintaining safe remote vehicle operation. The method comprises: analyzing network conditions for a vehicle, wherein at least a portion of vehicle operations for the vehicle are performed based on remote instructions, wherein the remote instructions are sent by a device which is remote from the vehicle; determining at least one safety measure decision for the vehicle based on the analyzed network conditions, wherein the at least one safety measure decision includes a set of safety measure instructions to be sent to a safety system of the vehicle; and implementing the at least one safety measure decision with respect to the vehicle by sending the set of safety measure instructions to the safety system of the vehicle, wherein the safety system controls the vehicle operations based on the set of safety measure instructions.

Certain embodiments disclosed herein also include a non-transitory computer readable medium having stored thereon causing a processing circuitry to execute a process, the process comprising: analyzing network conditions for a vehicle, wherein at least a portion of vehicle operations for the vehicle are performed based on remote instructions, wherein the remote instructions are sent by a device which is remote from the vehicle; determining at least one safety measure decision for the vehicle based on the analyzed network conditions, wherein the at least one safety measure decision includes a set of safety measure instructions to be sent to a safety system of the vehicle; and implementing the at least one safety measure decision with respect to the vehicle by sending the set of safety measure instructions to the safety system of the vehicle, wherein the safety system controls the vehicle operations based on the set of safety measure instructions.

Certain embodiments disclosed herein also include a system for maintaining safe remote vehicle operation. The system comprises: a processing circuitry; and a memory, the memory containing instructions that, when executed by the processing circuitry, configure the system to: analyze network conditions for a vehicle, wherein at least a portion of vehicle operations for the vehicle are performed based on remote instructions, wherein the remote instructions are sent by a device which is remote from the vehicle; determine at least one safety measure decision for the vehicle based on the analyzed network conditions, wherein the at least one safety measure decision includes a set of safety measure instructions to be sent to a safety system of the vehicle; and implement the at least one safety measure decision with respect to the vehicle by sending the set of safety measure instructions to the safety system of the vehicle, wherein the safety system controls the vehicle operations based on the set of safety measure instructions.

Certain embodiments disclosed herein include the method, non-transitory computer readable medium, or system noted above, further including or being configured to perform the following step or steps: detecting a trigger event based on the vehicle operations for the vehicle, wherein the network conditions are analyzed when the trigger event has been detected.

Certain embodiments disclosed herein include the method, non-transitory computer readable medium, or system noted above, further including or being configured to perform the following step or steps: selecting the trigger event based on the at least a portion of the vehicle operations which are performed based on the remote instructions.

Certain embodiments disclosed herein include the method, non-transitory computer readable medium, or system noted above, wherein the trigger event is selected based further on an availability of historical network connection data for a location of the vehicle.

Certain embodiments disclosed herein include the method, non-transitory computer readable medium, or system noted above, wherein the trigger event is selected based further on a degree of remote operation of the vehicle, wherein the degree of remote operation is determined based on a proportion of the vehicle operations which are performed based on the remote instructions.

Certain embodiments disclosed herein include the method, non-transitory computer readable medium, or system noted above, further including or being configured to perform the following step or steps: selecting a safety measure policy for the vehicle, wherein the at least one safety measure decision is determined based further on the selected safety measure policy.

Certain embodiments disclosed herein include the method, non-transitory computer readable medium, or system noted above, wherein the safety measure policy is a first safety measure policy selected from among a plurality of predetermined safety measure policies.

Certain embodiments disclosed herein include the method, non-transitory computer readable medium, or system noted above, wherein the safety measure policy is selected based on a vehicle type of the vehicle.

Certain embodiments disclosed herein include the method, non-transitory computer readable medium, or system noted above, wherein the safety measure policy is selected based on available abilities of a remote operator of the vehicle.

Certain embodiments disclosed herein include the method, non-transitory computer readable medium, or system noted above, wherein the safety measure policy is selected based on an amount of historical network connection data is available for a location of the vehicle.

Certain embodiments disclosed herein include the method, non-transitory computer readable medium, or system noted above, further including or being configured to perform the following step or steps: analyzing historical network conditions for an expected future location of the vehicle, wherein the at least one safety measure decision is determined based further on the analysis of the historical network conditions.

Certain embodiments disclosed herein include the method, non-transitory computer readable medium, or system noted above, wherein the analyzed historical network conditions is a subset of a set of historical network conditions included in a mapping, wherein the set of mapping maps the set of historical network conditions to a plurality of respective historical locations, wherein analyzing the historical network conditions further comprises analyzing the mapping.

Certain embodiments disclosed herein include the method, non-transitory computer readable medium, or system noted above, wherein the at least one safety measure decision includes a decision on how to arbitrate between remote operation instructions and local operation instructions.

Certain embodiments disclosed herein include the method, non-transitory computer readable medium, or system noted above, wherein the at least one safety measure decision includes a sensitivity for each of at least one assisted driving system.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
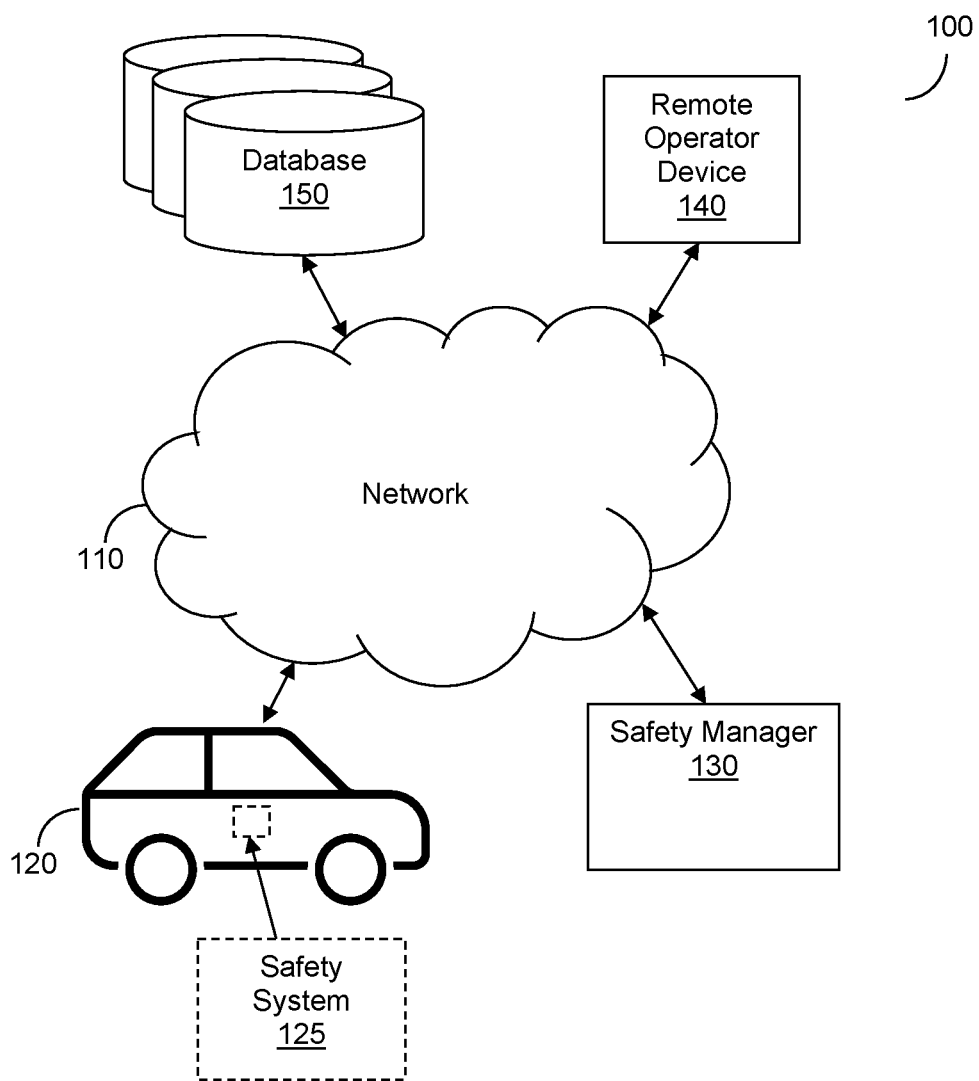
FIG. 1 is a network diagram utilized to describe various disclosed embodiments.

The various disclosed embodiments include techniques for maintaining safety for a vehicle equipped with remote operation capabilities such as by setting safety system configurations and arbitrating safety decisions between local systems installed on a vehicle and remote operator devices, and in particular for maintaining such safety using network conditions. The disclosed embodiments utilize data related to network conditions a vehicle is experiencing or is expected to experience in order to determine safety measures such as configuring a safety system to make decisions about whether to implement remote operation commands depending on whether the network conditions for the vehicle at a given location will likely hinder the remote operator's ability to safely control the vehicle.

The various disclosed embodiments include techniques for analyzing network conditions in order to maintain safety for vehicles which are remotely operated, i.e., vehicle for which at least some vehicle operations are based on remote instructions. Accordingly, the disclosed embodiments may be utilized to maintain safety of vehicles for which remote operations may be affected by variations in network conditions such that the disclosed embodiments may help ensure safety for remotely operated vehicles subject to variable network conditions.

In this regard, it is noted that remote operators may assume some control over a vehicle, but that effective remote operation of a vehicle relies upon network conditions. That is, if network conditions are poor, the operator may not timely receive all relevant data needed to make safe driving decisions, or commands sent by the remote operator may not be received in time to effectively implement the commands at an appropriate time. For example, when there is significant lag, video data may take longer to receive on the remote operator's end and, consequently, the remote operator may not be able to make appropriate driving decisions until after those decisions would be needed. By leveraging current or expected network conditions to set safety system configurations or otherwise make safety decisions as discussed herein, driving choices made locally at the vehicle may be prioritized over remote operator commands in circumstances where the remote operator cannot effectively make safe driving decisions or cannot make decisions quickly enough to prevent harm.

Moreover, local systems such as driving assistance systems may be used to aid a remote operator in safely controlling the vehicle. In some circumstances, a remote operator may be able to override these kinds of driving assistance systems like a local driver or autonomous driving system might. For example, a remote operator may override a lane assistance system when departing the lane is needed to avoid an obstacle or other vehicle. However, it has been identified that, when network conditions are poor, a remote operator attempting to override a driving assistance system may actually decrease the safety of the vehicle. Accordingly, by ignoring certain remote operator commands based on network conditions as described herein, vehicles subject to remote operation can be controlled more safely.

As a non-limiting example, a remote operator driving a vehicle may choose to override certain automated driving decisions such as lane assist controlling steering in order to keep a vehicle centered within a lane. When network conditions of the vehicle are poor at a current location, such override decisions may be ignored, or the vehicle may otherwise be placed into an idle or autopilot state, until a time or location at which network conditions improve such that remote operation decisions can be made effectively and timely.

Additionally, various disclosed embodiments further include techniques for optimizing communications between a connected vehicle and remote operator devices in order to improve safety of remote operation. In such embodiments, the amount or types of data being communicated between a connected vehicle and a remote operator device may be limited in order to concentrate use of resources on transmitting safety-relevant data. As a non-limiting example, a number of notifications being sent to a remote operator may be limited, or a limit rate of notifications which are not safety-critical (e.g., as determined using predetermined safety critical identification rules) may be reduced, when network conditions are poor (e.g., when values representing one or more network conditions are below respective predetermined thresholds).

FIG. 1 shows an example network diagram 100 utilized to describe the various disclosed embodiments. In the example network diagram 100, a vehicle 120, a safety manager 130, a remote operator device 140, and one or more database 150 communicate via a network 110. The network 110 may be, but is not limited to, a wireless, cellular or wired network, a local area network (LAN), a wide area network (WAN), a metro area network (MAN), the Internet, the worldwide web (WWW), similar networks, and any combination thereof.

In accordance with various disclosed embodiments, the vehicle 120 is a connected vehicle capable of connecting to other systems over one or more networks such as the network 110. The vehicle 120 may use such connections in order to receive data such as, but not limited to, commands (e.g., from a remote operator or fleet manager), navigation data, data from other vehicles (e.g., data indicating obstacles or other navigation challenges encountered by the other vehicles), combinations thereof, and the like. Additionally, the vehicle 120 may utilize such connections in order to send data such as, but not limited to, network connectivity data (e.g., data indicative of strength or quality of network conditions of the vehicle 120), vehicle operation data, sensor data captured from sensors (not shown) installed on the vehicle 120, requests for assistance (e.g., requests generated in response to user inputs from an operator of the vehicle 120), combinations thereof, and the like.

In accordance with various disclosed embodiments, the vehicle 120 is at least partially remotely operated. In other words, at least some vehicle operations of the vehicle 120 are performed based on instructions or other data received remotely (i.e., from a device external to the vehicle 120 such as, but not limited to, the remote operator device 140). It should be noted that, in at least some embodiments, the safety of the vehicle 120 may be maintained based on analysis of network conditions as described herein even if the vehicle 120 is not fully operated remotely, i.e., if only some vehicle operations are performed based on remote instructions and other vehicle operations are performed based on local instructions or inputs.

In an embodiment, the vehicle 120 is equipped with a safety system 125. The safety system 125 is configured to control one or more safety-related features of the vehicle 120 such as, but not limited to, assisted driving features, remote driving features, autonomous driving features, combinations thereof, and the like.

The safety manager 130 is configured to select configurations for the safety system 125, to make safety-related decisions for the vehicle 120, or both, in accordance with various disclosed embodiments. In accordance with various disclosed embodiments, the safety manager 130 is configured to make such decisions based on network conditions related to the vehicle 120. That is, depending on the current or expected future network conditions for the vehicle 120, the safety manager 130 is configured to make decisions which will decrease the likelihood of an incident due to unsafe operation of the vehicle 120.

To this end, the safety-related decisions made by the safety manager 130 may effectively arbitrate between local operation decisions made by a manual operator or local autonomous driving system (not shown) installed on the vehicle 120 and remote operation decisions made or otherwise received via a remote operator device 140. The remote operator device 140 may, in turn, receive inputs from a user of the remote operator device 140 (e.g., via one or more input/output devices, not shown) and utilize those inputs in order to generate data to be sent to the vehicle 120. Such data may include commands, instructions, or other data to be used by the vehicle 120 in order to control at least a portion of activities performed via the vehicle 120.

The remote operator device 140 may be or may include a system configured to receive inputs from a remote operator (e.g., via one or more input/output devices, not shown) and to send commands, instructions, or other data based on those inputs to the vehicle 120. The remote operator device 140 may be operated by a user who is not the drive of the vehicle 120 (i.e., not a local driver sitting in or otherwise in physical proximity to the vehicle 120, and more specifically may be hosted at remote location from the vehicle 120 (e.g., a different geographic location such as at different coordinates, in a different city or country, etc.). Remote operation of the vehicle 120 may therefore be realized by the remote operator device 140 via communication over one or more networks such as, but not limited to, the network 110.

The databases 150 may store information used in accordance with any or all of the disclosed embodiments such as, but not limited to, data from other connected vehicles (not shown) such as network condition data indicating network conditions experienced by other connected vehicles, weather data, navigation data (e.g., maps, traffic conditions, road conditions, etc.), combinations thereof, and the like.

It should be noted that the embodiments described herein are not limited to the example deployment depicted in FIG. 1, and that the disclosed embodiments may be equally applied to other situations and deployments without departing from the scope of the disclosure. In particular, safety systems of multiple connected vehicles, remote operation decisions from multiple remote operator devices, or both, may be managed via the safety manager 130 in accordance with various disclosed embodiments.

Additionally, the safety manager 130 is depicted as a separate component from the safety system 125 of the vehicle 120 for example purposes, but at least some embodiments may include realizing the safety manager 130 as a logical component of the safety system 125, as part of code of the safety system 125, or otherwise installing the safety manager 130 on the vehicle 120.

Figure 2:
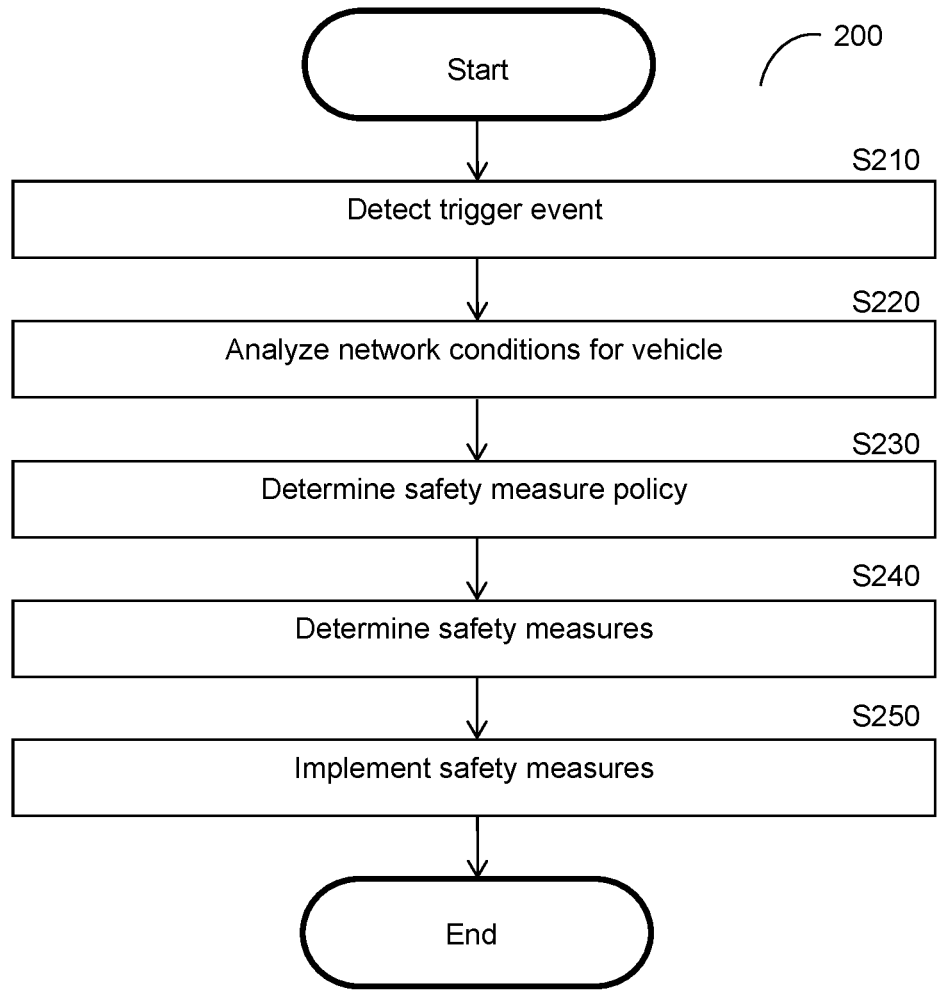
FIG. 2 is a flowchart illustrating a maintaining safety of a remotely operated vehicle according to an embodiment.

FIG. 2 is a flowchart 200 illustrating a method for maintaining safety of a remotely operated vehicle according to an embodiment. In an embodiment, the method is performed by the safety manager 130, FIG. 1.

At optional S210, a trigger event is detected. The trigger event is defined as a set of one or more criteria related to the vehicle which may require adjusting the safety measures (e.g., safety system configuration, settings, policies, specific safety decisions, or a combination thereof) in order to ensure safe driving. In particular, in accordance with various disclosed embodiments, one or more of these criteria relate to network conditions such that the trigger event effectively includes triggering when network conditions might interfere with safe remote operation of the vehicle. In some embodiments, execution may begin without first detecting a trigger event.

In some embodiments, the trigger events to be detected may be selected from among potential trigger events based on the kinds of remote operation activities being performed, for example, based on a degree of remote operation (i.e., how much of the vehicle's operations are being controlled based on remote instructions as compared to local choices), specific types of remote operation actions being performed, or both. An example process for selecting trigger events and detecting the selected trigger events is described further below with respect to FIG. 3.

Further, in some embodiments, alternative sets of trigger criteria may each cause a trigger event to be detected. That is, one set of criteria may correspond to a first type of trigger event, and another set of criteria may correspond to a second type of trigger event. In such embodiments, if the criteria for either the first or second type of trigger event are met (not necessarily both sets of criteria), then a trigger event may be detected.

Non-limiting example criteria used to define trigger events may include, but are not limited to, degradation of network conditions (e.g., one or more parameters representing respective aspects of network conditions dropping below respective thresholds), triggering of a safety system of the vehicle during remote operation (e.g., triggering of a lane assist feature while at least some aspects of vehicle operation are being controlled remotely), navigating to a location known to have poor network conditions (e.g., determined based on historical network conditions as discussed below), assignment of a navigation route including a location known to have poor network conditions, a combination thereof, and the like.

As noted above, different kinds of remote vehicle operation activities may require certain network conditions in order to ensure that remote operation can be performed effectively (and, consequently, ensure safe operation of the vehicle when operating based on remote driving instructions or commands). Accordingly, triggering changes to safety measures based on network conditions allows for improving safe remote operation of the vehicle.

In some embodiments, multiple trigger events may be detected, and different flows may be executed depending on the types of trigger events which were detected. As a non-limiting example, some trigger events may be assigned to a proactive process (e.g., the process discussed further below with respect to FIG. 5) and other trigger events may be assigned to a reactive process (e.g., the process discussed further below with respect to FIG. 6). In such embodiments, subsequent execution may depend on which types of trigger events were detected. For example, different safety measure decision policies may be applied for reactive and proactive processes such that different safety measure decisions are determined depending on whether the trigger event belongs to a reactive process or a proactive process (or whether trigger events for both types of processes have been detected).

At S220, network conditions are analyzed for a vehicle. Analyzing the network conditions may include, but is not limited to, identifying or determining values for parameters representing respective predetermined aspects of network condition (e.g., network metrics such as latency, jitter, packet loss, throughput, speed, bandwidth, network availability, packet duplication, error rate round-trip time, combinations thereof, and the like). Such values may be determined based on data received from the vehicle, from the network, from one or more systems communicating with the vehicle (e.g., a remote operator device), a combination thereof, and the like.

At S230, one or more safety measure policies to be applied to the vehicle are determined. The safety measure policies to be applied to the vehicle are determined based on one or more available safety-related abilities of the vehicle, a remote operator of the vehicle, or both, and may further be determined based on the analysis of the network conditions. The available safety-related abilities of the vehicle may, in turn, be determined based on a type of the vehicle (i.e., using predetermined known safety-related abilities for different known types of vehicles). The available safety-related abilities of the remote operator may be determined based on an identity of the remote operator (e.g., an identity having certain permissions), certain known capabilities or authorizations of the remote operator, both, and the like.

In some embodiments, the safety measure policies may be further determined based on an amount of historical network condition data which is available for use in making safety measure decisions. As a non-limiting example, safety measure policies which implement more conservative safety decisions to be used in a given location may be selected when less historical network condition data is available for that location.

An example process for determining safety measure policies to be applied to a vehicle is described further below with respect to FIG. 4.

At S240, one or more safety measure decisions are determined for the vehicle based on the safety measure policies and the analysis of the network conditions for the vehicle. To this end, in an embodiment, S240 includes applying the determined safety measure policies to the vehicle. The safety measure decisions include one or more decisions to be realized via a safety system of the vehicle and may include, but are not limited to, safety system arbitration decisions, preventative measures, specific safety decisions, combinations thereof, and the like. To this end, the safety measure decisions include decisions for commands or other instructions to be sent to the safety system of the vehicle.

The safety measure decisions may be or may include decisions to utilize a certain arbitration policy to arbitrate between operational choices made locally (e.g., by a driver of the vehicle or by a local driving system installed on the vehicle) and choices made remotely (e.g., by a remote operator) such that the safety system utilizing such an arbitration policy selects whether to perform activities requested locally or activities requested remotely based on the arbitration policy.

In an embodiment, S240 further includes applying conflict resolution rules in order to resolve conflicts between the determined safety measure decisions. To this end, in some embodiments, predetermined conflict resolution rules may be applied in order to choose between potential safety measure activities. Such conflict resolution rules may indicate known types of conflicting safety measure activities and which safety measure activity should be performed when a conflict occurs.

As a non-limiting example, if a safety measure for a reactive process includes ignoring remote operator override commands while a safety measure for a proactive process includes triggering warning systems earlier (e.g., analyzing sensor signals from a farther distance to potential obstacles) in order to allow the remote operator to effectively override driving assistance systems, conflict resolution rules may define the ignoring of override commands for the reactive process as taking priority over allowing override commands for the proactive process (i.e., such that override commands are ignored rather than executed).

In this regard, it is noted that different safety measures may be taken depending on whether a proactive or reactive process (or both) has been triggered. As a non-limiting example, in some embodiments, safety measures including making specific safety decisions may be taken during the reactive process, while safety system arbitration setting and configuration modifications may be performed during the proactive process. The particular safety measure activities which are performed depending on whether the reactive or proactive process has been triggered may be predetermined and performed depending on which process's trigger event or trigger events were triggered.

It is further noted that some safety measures may conflict, particularly when safety measures for both the reactive and proactive processes are being performed in parallel.

In this regard, it is noted that some situations may cause certain safety measures to be more important for safety than other safety measures. In particular, reactive situations where the vehicle is already experiencing poor network conditions (and therefore may be in imminent danger) may take priority over proactive situations based on locations the vehicle has not navigated to yet. Use of conflict resolution rules in this manner may therefore further improve safety of the vehicle.

At S250, the safety measure decisions are implemented. Implementing the safety measure decisions may include, but is not limited to, sending commands, sending instructions, or otherwise sending data indicating settings, configurations, or arbitration policies which the safety system should utilize. Such data may further indicate durations of time, locations, or other information indicating when such settings, configurations, or arbitration policies should be utilized by the safety system.

Figure 3:
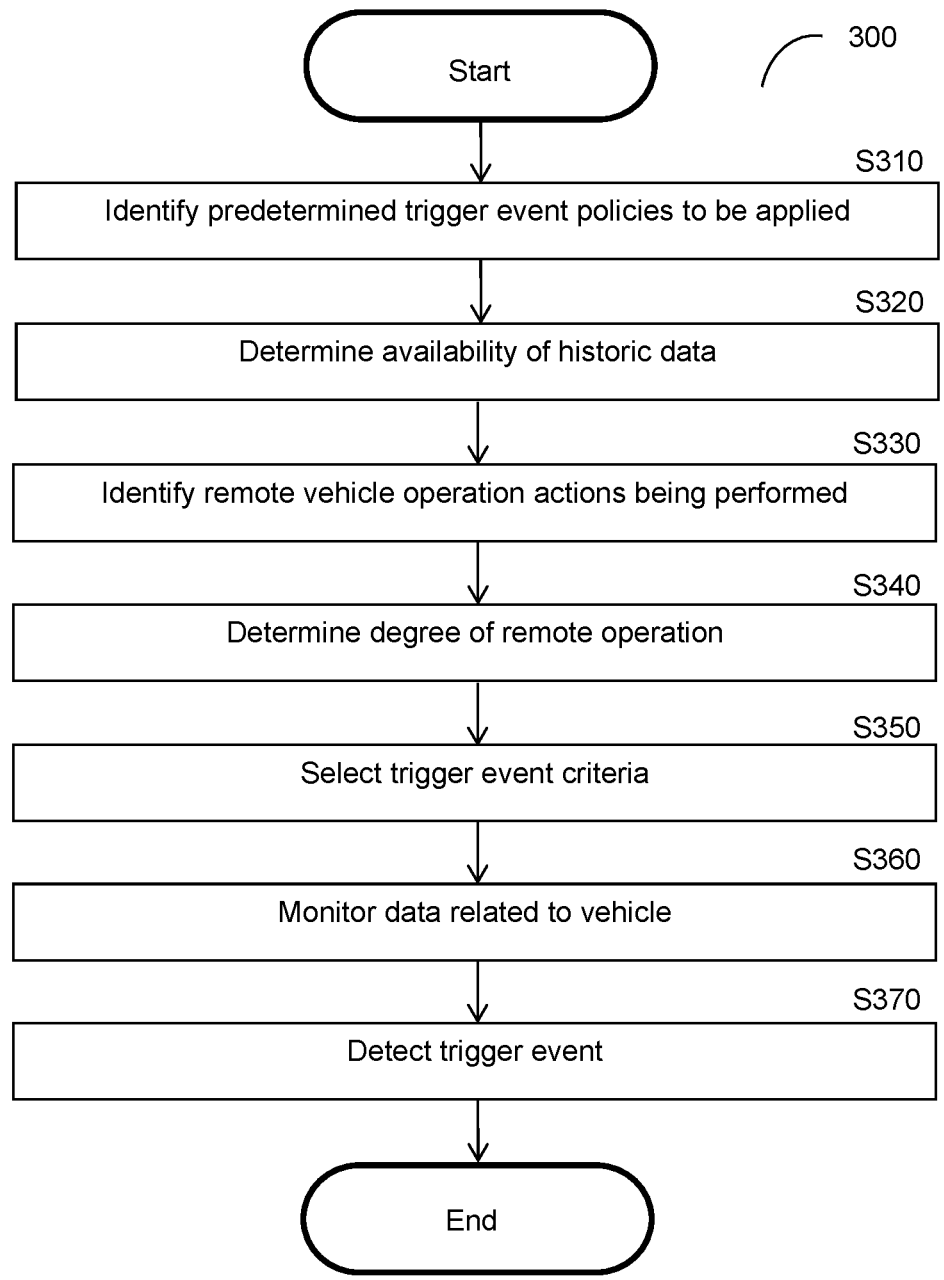
FIG. 3 is a flowchart illustrating a method for detecting a trigger event with respect to vehicle activity according to an embodiment.
Figure 4:
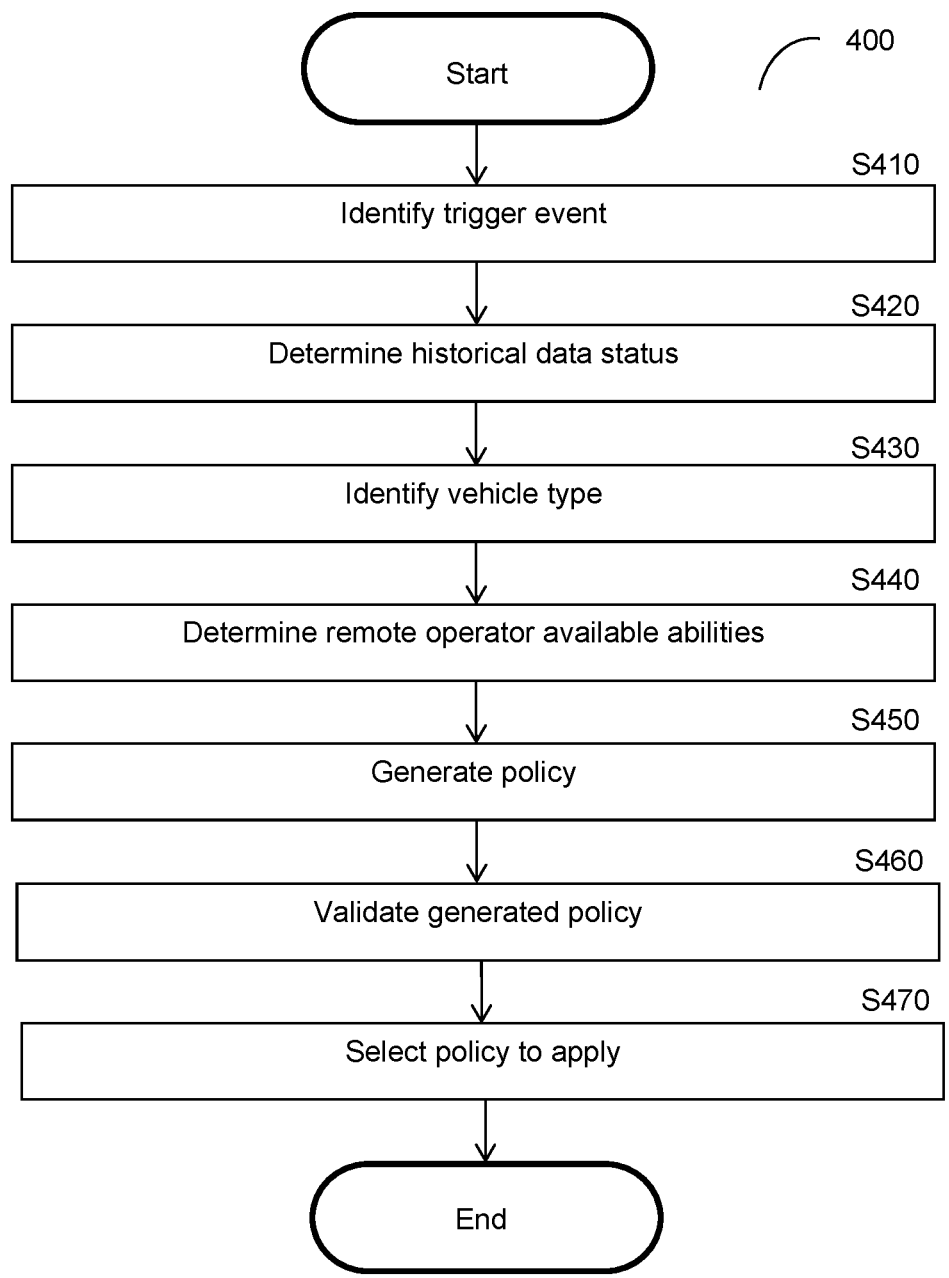
FIG. 4 is a flowchart illustrating a method for selecting a safety measure policy according to an embodiment.

It should be noted that a single iteration of the process is depicted in FIG. 4 for simplicity purposes, but that multiple iterations of the process may be performed in sequence or in parallel. In particular, additional trigger events may be detected after one set of safety measure decisions has been implemented, and additional safety measure decisions may be implemented FIG. 3 is a flowchart 300 illustrating a method for detecting a trigger event with respect to vehicle activity according to an embodiment. In an embodiment, the method is performed by the safety manager 130, FIG. 1.

At S310, predetermined trigger event policies to be applied may be identified. The predetermined trigger event policies may be defined by a supervisor or manager, and may be assigned respective sets of circumstances At S320, availability of historical network connection data may be determined for a given location (e.g., a location where the vehicle is or is expected to be). More specifically, the availability of historical network connection data may be determined with respect to an amount of historical data available for that location.

At S330, remote vehicle operation actions being performed with respect to the vehicle are identified. The remote vehicle operations being performed may be identified with respect to predetermined types of actions, frequency of actions, both, and the like.

In this regard, it is noted that some kinds of actions initiated remotely may require more reaction time than other kinds of actions or otherwise may require real-time assistance. For those kinds of actions, more conservative safety measure policies may be implemented in order to ensure that actions are taken sufficiently promptly.

At S340, a degree of remote operation is determined. The degree of remote operation is determined based on a proportion of vehicle operations which are performed based on remote operations as compared to as compared to all vehicle operations (local and remote) and may be expressed, for example, as a percentage or proportion of driving decisions, in one of multiple predetermined categories (e.g., fully autonomous, remote-assisted, remote-takeover, fully remote, etc.), and the like. To this end, the degree of remote operation may be determined based on the remote vehicle actions being performed and based on any actions being performed by local systems or drivers.

In some embodiments, the degree of remote operation may further be determined based on the types of activities being performed remotely as compared to locally. To this end, in such embodiments, the degree of remote operation may be realized via a weighted scoring process or otherwise by assigning different predetermined values to different types of activities such that certain types of activities influence the degree of remote operation more than others. As a non-limiting example, steering activities may be assigned a higher weight than navigation decision activities because steering remotely carries a higher risk of incident due to network condition issues than simply selecting the next destination or otherwise selecting a route for a vehicle.

In this regard, it is noted that the relative amount of remote operation as compared to location operation activities may result in situations where more conservative safety measure policies will substantially improve safety. That is, as more activities related to controlling the vehicle are performed remotely, the likelihood that issues with network conditions will create additional danger increases. Conversely, when most vehicle operations are controlled locally, there is a lower risk that network condition issues will materially affect safety. Accordingly, utilizing relative amount of remote operation to determine whether to select more conservative safety measure policies allows for further improving vehicle safety.

At S350, one or more trigger event criteria are selected based on the remote vehicle operation actions and, optionally, the degree of remote operation. The trigger event criteria may be selected from among predetermined trigger event criteria or may be generated based on predetermined trigger event criteria data structures (e.g., generated by adding values to fields in such a data structure, where the values may represent specific thresholds or other values used for determining whether a given type of criteria has been met).

In an embodiment, the trigger event criteria are selected based on the availability of historical network connection data, the remote vehicle operation actions being performed, the degree of remote operation, or a combination thereof. More specifically, in some embodiments, the trigger event criteria are selected at least using the remote vehicle operation actions being performed. To this end, in an embodiment, S340 includes applying one or more trigger event criteria selection rules defined with respect to the remote vehicle operations being performed (e.g., correlating certain remote vehicle operations or combinations of remove vehicle operations to certain trigger events), and optionally defined further with respect to the availability of historical connection data, the degree of remote operation, any applicable predetermined trigger event policies, or a combination thereof.

In some embodiments, trigger events may be selected in order to select more conservative trigger events when less historical network connection data is available (e.g., when the amount of available historical network connection data is below a threshold) in order to improve safety of vehicles operating in relatively unknown network conditions. In an embodiment, a trigger event is more conservative than a trigger event of the same type when a value (e.g., a threshold) for that trigger event is set such that the trigger event is more likely to be detected. As a non-limiting example, when a trigger event is defined with respect to network speed dropping below a threshold, a more conservative trigger event would utilize a higher threshold than a less conservative trigger event such that network speed would need to decrease less in order to trigger the higher threshold being met.

At S360, data related to the vehicle is monitored with respect to the selected trigger event criteria. To this end, monitoring the data may include monitoring for events, operational parameters, network condition measurements, or a combination thereof, having values represented among the trigger event criteria.

At S370, a trigger event is detected when the selected trigger event criteria have been met.

FIG. 4 is a flowchart 400 illustrating a method for selecting a safety measure policy according to an embodiment. In an embodiment, the method is performed by the safety manager 130, FIG. 1.

At S410, a trigger event is identified. The trigger event may be a trigger event detected as discussed above with respect to S210.

In some embodiments, S410 may include determining a type of trigger event based on predetermined associations between trigger events and respective safety measure workflows (e.g., associations of certain trigger events to reactive processes and other trigger events to proactive processes). As discussed herein, different trigger events may be utilized to trigger a reactive process than a proactive process.

At S420, a status of historical data is determined. The status of the historical data may include, but is not limited to, an amount of historical data for a given location (e.g., as measured with respect to a number of values or how many different periods of time are represented by network condition data for a given location). In other words, the status may represent how much historical data is available to make decisions related to safety measures which might be utilized for selecting an appropriate safety measure policy.

As noted above, in some embodiments, more conservative safety measure policies (e.g., a safety measure policy which sets sensitivity for triggering driving assistance systems lower than other safety measure policies) may be selected for use when less historical data is available for a given area (e.g., when an amount of historical data is below a predetermined threshold). As a non-limiting example, when a vehicle is traveling in an area for which little or no historical network connection data is available, a safety measure policy which sets sensitivity of assisted driving or detection systems low may be selected in order to give a remote operator more time to react to incoming data.

At S430, a vehicle type of the vehicle is identified. The vehicle type may be or may include make and model, year, both, and the like. In an embodiment, the type of vehicle may be utilized to determine aspects of the vehicle related to remote operation and to provide remote operation contextual data such as, but not limited to, driving assistance features of the vehicle (e.g., lane assist, backup camera, cruise control, forward collision warning, blind spot detection, night vision, rear traffic alert, etc.), whether the vehicle is autonomous, whether an autonomous vehicle is capable of being operated by a manual driver (e.g., whether an autonomous vehicle has steering, acceleration, and braking controls for a human operator), a combination thereof, and the like.

Such remote operation contextual data allows for making better safety decisions such as, but not limited to, determining safety measures for the vehicle (e.g., maximum speed, whether to use autopilot versus remote operator, whether to allow remote override of safety features, etc.) as discussed herein.

In some implementations, the vehicle type may correspond to a particular set of sensors such that the vehicle type may be utilized to determine a sensor suite expressed, for example but not limited to, with respect to types of sensors, numbers of sensors, or both. More specifically, different vehicle types may have different types of sensors, different numbers of each type of sensor, both, and the like. To this end, in some embodiments, S430 further includes determining a sensor suite for the vehicle (e.g., expressed as types of sensors among the vehicle's sensors, a number of sensors of the vehicle, a number of each type of sensor of the vehicle, locations of sensors relative to the vehicle, etc.) based on the vehicle type. In a further embodiment, data from the vehicle indicating whether any sensors are malfunctioning, disconnected, or otherwise unavailable may also be used to determine the sensor suite. In other words, sensors which are unavailable may be excluded from the sensor suite.

The sensor suite for a vehicle affects the data which may be provided to a remote operator. That is, the sensors capture signals which may be transmitted as data to the remote operator and used for making remote driving decisions. In accordance with various disclosed embodiments, aspects of the sensor suite such as the types and numbers of sensors may be utilized to determine whether certain network conditions are poor. That is, different thresholds or other criteria for poor network conditions may be utilized depending on the types and numbers of sensors whose signals are to be transmitted to a remote operator. As a non-limiting example, when the sensors include a camera which captures video data and a network speed is below a threshold, network conditions for transmitting such video content may be determined as poor. Accordingly, remote operator decisions which would be based on such video data (e.g., overriding a lane assist feature) may be ignored while the network speed remains below such a threshold.

At S440, available abilities of a remote operator are determined for a remote operator of the vehicle. The available abilities relate to potential actions which may be initiated or otherwise controlled remotely with respect to the vehicle and may include, but are not limited to, types of actions, ranges of available values or inputs for actions, systems or subsystems which are available to the remote operator, combinations thereof, portions thereof, and the like. In other words, the available abilities can be utilized to determine which specific actions related to operation of the vehicle can be performed by a given remote operator which, in turn, may be utilized to determine an applicable safety measure policy for the vehicle. As a non-limiting example, if a remote operator does not have steering as an available action, limitations on remote steering may not need to be included in any safety measure policies for the vehicle, and a safety measure policy which does not define any conditions for steering may be selected.

The available abilities of the remote operator may be determined based on factors such as, but not limited to, capabilities of the remote operator (e.g., as defined based on level of experience), capabilities of an operator station of the remote operator (e.g., as defined with respect to available hardware such as input devices available at such an operator station such as steering wheel, pedals, mouse, keyboard, etc.), predetermined skills of the remote operator (e.g., known remote operator actions associated with the operator), permissions of the remote operator (e.g., predetermined actions which the remote operator is authorized or otherwise granted permission to perform), combinations thereof, portions thereof, and the like.

As noted above with respect to S430, aspects of the vehicle related to remote operation of the vehicle may be determined based on the vehicle type. This remote operation contextual data may relate to potential actions which may be performed with respect to the vehicle by a remote operator.

At optional S450, a safety measure policy is generated based on a combination or subcombination of the historical data status, the vehicle type, and the remote operator capabilities. That is, in some embodiments, a safety measure policy may be generated dynamically rather than selected from among predetermined policies. To this end, generating the safety measure policy may include, but is not limited to, selecting from among a predetermined set of potential policy features defining respective aspects of the safety measure policy such as, but not limited to, sensitivities, limitations or restrictions, conflict resolution rules, combinations thereof, and the like. Further, specific values of such policy features (e.g., particular sensitivity values, values of limitations, etc.) may be determined based on combination or subcombination of the status, the vehicle type, and the remote operator capabilities.

As noted above, more conservative policies may be used depending on circumstances, and in at least some embodiments more conservative policies may be policies having higher or lower thresholds (depending on threshold type) such that the threshold for triggering certain safety measures is easier to meet (e.g., a lower value for a threshold that is met by increases in network condition metrics or a higher value for a threshold which is met by decreased network condition metrics).

At optional S460, the generated safety measure policy is validated. In an embodiment, validating the safety measure policy includes applying one or more predetermined safety measure policy validation rules. In a further embodiment, the safety measure policy may be analyzed using machine learning (e.g., using a machine learning model trained to identify valid sets of policies based on input combinations of policy features, values of policy features, or both).

Such a machine learning model may be trained using a training set including training policy features, values of policy features, or both, of known training examples of safety measure policies. Optionally, such a machine learning model may be trained using supervised learning by additionally including training labels for respective combinations of policy features and/or values, for example, predetermined training labels indicating whether the corresponding safety measure policy for each such combination is valid or invalid.

At S470, a safety measure policy is selected to be applied to a safety system of the vehicle based on a combination or subcombination of the historical data status, the vehicle type, and the remote operator capabilities. In an embodiment, selecting the safety measure policy includes applying predetermined safety measure policy selection rules defined with respect to potential combinations or subcombinations of status, vehicle type, and remote operator capabilities.

When a policy is generated at S450, the selected policy may be the generated policy. Otherwise, the policy may be selected from among a set of predetermined policies. In this regard, it is noted that selecting from predetermined policies allows for empirically providing the safety of a given system which utilizes the policies under different conditions. That is, by selecting from a limited set of predetermined policies rather than generating policies, a system which selects from among this limited set of policies may be tested under various conditions that trigger each of the policies that is reproducible. Accordingly, selecting from among predetermined policies may facilitate verification of system safety for regulators, inspectors, or other entities tasked with evaluating the safety of systems and fitness for road use.

Figure 5:
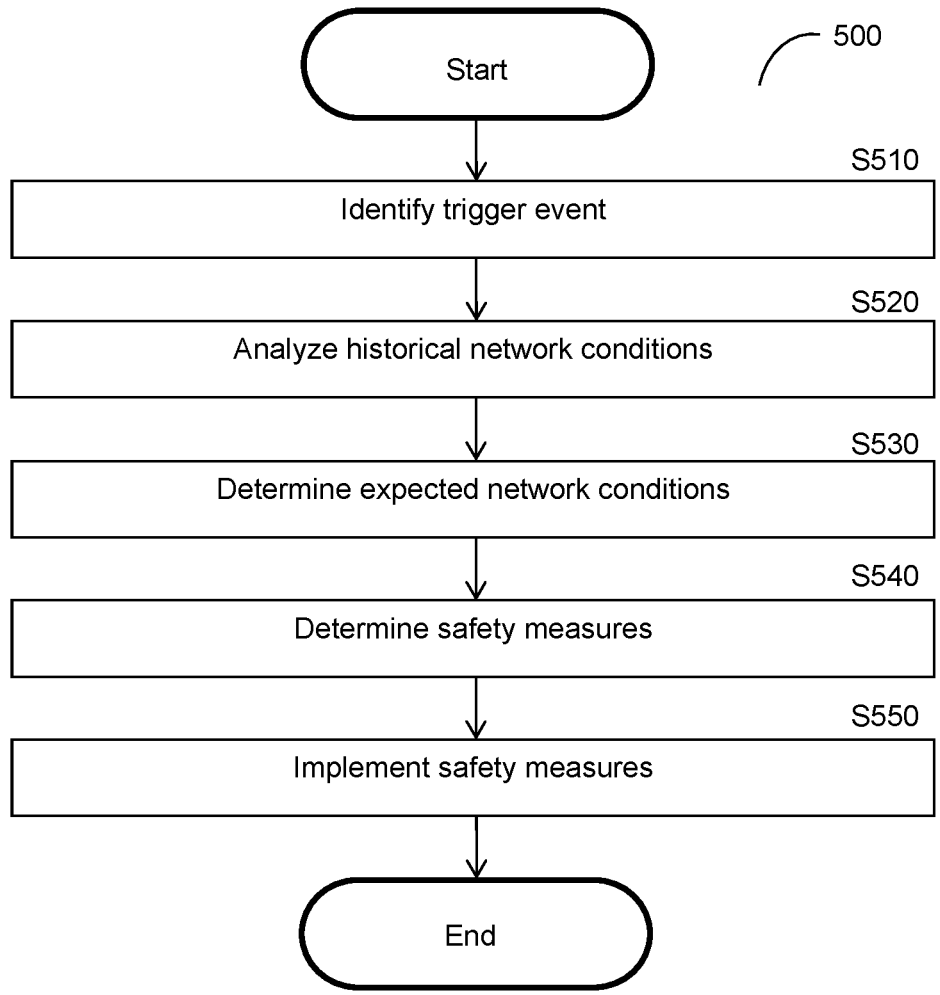
FIG. 5 is a flowchart illustrating a method for proactively maintaining safety of a remotely operated vehicle according to an embodiment.

FIG. 5 is a flowchart 500 illustrating a method for proactively maintaining safety of a remotely operated vehicle according to an embodiment. In an embodiment, the method is performed by the safety manager 130, FIG. 1.

At optional S510, a trigger event may be detected with respect to a vehicle. In some embodiments, execution may begin without first detecting a trigger event. The trigger event is defined as a set of one or more criteria related to the vehicle which may require adjusting the safety measures (e.g., safety system configuration, settings, policies, specific safety decisions, or a combination thereof) in order to ensure safe driving. In particular, in accordance with various disclosed embodiments, one or more of these criteria relate to network conditions such that the trigger event effectively includes triggering when network conditions might interfere with safe remote operation of the vehicle. Various non-limiting example criteria for trigger events are described further above with respect to FIG. 4.

The trigger event for the reactive process of FIG. 5 may be defined so as to allow for proactively configuring a safety system of the vehicle in order to optimize safety when making decisions related to operation of the vehicle while the vehicle is being at least partially remotely operated. That is, the trigger event may be defined based on predetermined criteria which are indicative of a high likelihood that network conditions may interfere with remote operation in the future such that proactively altering the manner in which the vehicle makes safety-related decisions (for example, prioritizing local decisions over remote operation decisions or heightening sensitivity of driving assistance features) may help to avoid dangerous situations before those dangerous situations require imminent reaction.

To this end, in some embodiments, the trigger event for the proactive process may be defined with respect to recent network conditions experienced by other vehicles within the same area (e.g., within a predetermined perimeter or distance of the vehicle's current location) or at future locations the vehicle is expected to navigate toward (e.g., based on current location and direction of the vehicle or a navigation route assigned to the vehicle). As a non-limiting example, network condition data indicating network conditions experienced by other vehicles at a location along a vehicle's current navigation route and within a threshold period of time (e.g., 2 seconds) of a current time may be analyzed in order to determine whether the network conditions experienced by those other vehicles will trigger the proactive process. As another example, data indicating that network condition-based trigger events were triggered for other vehicles recently in an expected future location of the vehicle may be used as trigger criteria for a trigger event.

At S520, historical network conditions are analyzed. The historical network conditions relate to a current area in which the vehicle is driving, or to one or more expected future locations of the vehicle, and include network conditions previously experienced by that vehicle, by other vehicles, or both. The historical network conditions may include, but are not limited to, network loads, bandwidth, latency, lag, jitter, reception information (e.g., as indicated in data from a remote operator device receiving data transmitted from the vehicle), combinations thereof, and the like.

In some embodiments, the analysis may further include analyzing environmental or other contextual data indicating information other than information about the network connectivity itself, but which may affect network connectivity. As a non-limiting example, such contextual data may include weather data, historical network connectivity patterns (e.g., predetermined days and times at which network conditions are known to be poorer than normal), known statuses of network devices (e.g., cellular towers, routers, or other devices that facilitate connecting vehicles to networks), combinations thereof, and the like.

In some embodiments, the historical network conditions may be historical network conditions indicated in a mapping, where the mapping maps historical network conditions to locations in which those historical network conditions were experienced. Moreover, such mapped historical network conditions may be realized as particular values (e.g., values experienced by a particular vehicle at a previous point in time), or as aggregate values (e.g., an average value or other value determined based on network conditions experienced by multiple vehicles passing through the same location at previous points in time).

In other embodiments, the historical network conditions may include historical network conditions experienced by other vehicles recently (e.g., within a predetermined period of time before the current time). Such recent historical network conditions may be analyzed, for example, as a vehicle approaches a particular location at which those historical network conditions were experienced by other vehicles (e.g., when the vehicle comes within a predetermined threshold distance of such a location or when a current navigation route of the vehicle includes such a location). In this regard, network conditions experienced by other vehicles in recent history for a location which the vehicle is navigating toward may be utilized in order to provide more accurate network condition data for network conditions which will likely be experienced by vehicles navigating to this location in the near future.

At S530, expected network conditions for the vehicle are determined based on the historical network conditions. The expected network conditions represent network conditions that the vehicle is expected to experience at a future time, for example, when the vehicle arrives at a particular location or area. In some implementations, multiple sets of expected network conditions may be determined, for example a set of one or more network conditions for each of multiple expected future locations where the vehicle is expected to navigate to in the future (e.g., based on a current location and movement of the vehicle or based on a navigation route planned for the vehicle).

In some embodiments, when the values of the historical network conditions are mapped, the expected network conditions may be or may be determined based on the historical network conditions mapped to an expected future location of the vehicle. In other embodiments, when the historical network conditions include network conditions experienced by other vehicles recently (e.g., within a threshold period of time), the expected network conditions may be determined based on network condition data from those other vehicles, and may be further determined based on known locations of those vehicles at different points in time when they experienced different network conditions. In other words, the expected network conditions for a given location may be determined based on historical network conditions experienced at that location at a previous time.

At S540, one or more safety measure decisions are determined based on the expected network conditions. More specifically, the safety measure decisions for the proactive process may include decisions for mitigating potential problems caused by the expected network conditions which may relate to one or more configurations, setting, policies, or a combination thereof, of a safety system of the vehicle to be used for purposes such as arbitrating between local driving commands and remote operator commands, to alter vehicle behavior or limits in order to proactively mitigate potential dangers, to modify sensitivity of systems utilized by the vehicle for making safety-related decisions, a combination thereof, and the like.

As a non-limiting example for modifying sensitivity of systems, a scanner configured to capture images used for identifying obstacles in front of the vehicle, a distance to be scanned may be increased from 20 meters ahead of the vehicle to 30 meters in order to provide more time for the remote operator to respond to obstacles detected via scanning.

In an embodiment, the safety measure decisions are determined based further on driving state of the vehicle. More specifically, in a further embodiment, the driving state of the vehicle may be defined with respect to speed of the vehicle, current or expected future locations (e.g., geographic locations in certain areas or having certain coordinates), both, and the like. That is, the specific safety measure decisions to be implemented may be determined further based on factors which may affect the response times for responding to obstacles such as how fast the vehicle is moving (i.e., such that slower vehicles have more response time for responding to obstacles than faster vehicles) and where the vehicle is driving or will be driving (e.g., certain locations may have more obstacles, faster moving obstacles, objects which suddenly manifest as obstacles, or otherwise be known to require shorter response times to avoid obstacles, hazards, or other potential dangers).

In a further embodiment, speed and response time to avoid obstacles and hazards may be considered in combination in order to further improve safety of the vehicle. For example, a vehicle moving very fast (e.g., above a threshold) in an otherwise high response time environment may nevertheless be assigned safety measures which require less response time since the higher speed of the vehicle will lower the amount of response time needed to avoid obstacles and hazards. Likewise, in some implementations, a vehicle moving slowly in a highly hazardous environment may be assigned safety measure decisions requiring slightly higher response times even when navigating in highly hazardous environments since the likelihood of an accident (let alone a particularly harmful accident) is much lower at lower speeds.

To this end, in some embodiments, determining the safety measure decisions further includes applying one or more predetermined driving state safety decision rules based on factors related to the driving state such as speed and location of a driving vehicle. Such rules may be defined with respect to predetermined relationships between speeds and response times, predetermined average response times in different locations (i.e., predetermined average response time values associated with respective locations), or both. Accordingly, such rules may be utilized to determine an expected response time for a vehicle in a certain driving state (e.g., as defined with respect to speed, location, or both, at a current or expected future time). Moreover, such rules may further define predetermined response times for different safety measures such that safety measures are determined so as to select safety measure decisions which have respective predetermined response times which are less than the expected response time for the vehicle in a current or expected future driving state.

In a further embodiment, determining the safety measure decisions further includes determining such an expected response time for the vehicle at a given point in time based on the driving state at that point in time (i.e., a driving state at a current point in time or an expected future driving state at a future point in time). Specifically, the expected response time may be determined based on driving state factors such as speed at that point in time, location at that point in time, or both. In yet a further embodiment, determining the safety measure decisions may further include determining the expected future driving state based on a current speed, a current location, a current direction, a navigation path, a combination thereof, and the like. The expected response time may then be determined using predetermined associations between driving states or combination of driving states (e.g., combination of speed and location) and predetermined average response times or other predetermined response times known to be used for avoiding potential obstacles and hazards using the driving state safety decision rules as noted above.

In this regard, it is noted that, in addition to network decisions, factors related to driving of the vehicle can affect the amount of response time needed to safely navigate away from or around obstacles and other hazards. Vehicles moving more slowly or navigating in environments where the response time needed to avoid the average obstacle is higher (i.e., the vehicle has more time to respond without being involved in a collision or accident) may be assigned safety measures which require more response time to execute than vehicles which are moving more quickly or navigating in environments where successfully avoiding obstacles and hazards require faster response times.

At optional S550, the safety measure decisions are implemented. Implementing the safety measure decisions may include, but is not limited to, sending commands, sending instructions, or otherwise sending data indicating settings, configurations, or arbitration policies which the safety system should utilize. Such data may further indicate durations of time, locations, or other information indicating when such settings, configurations, or arbitration policies should be utilized by the safety system.

Figure 6:
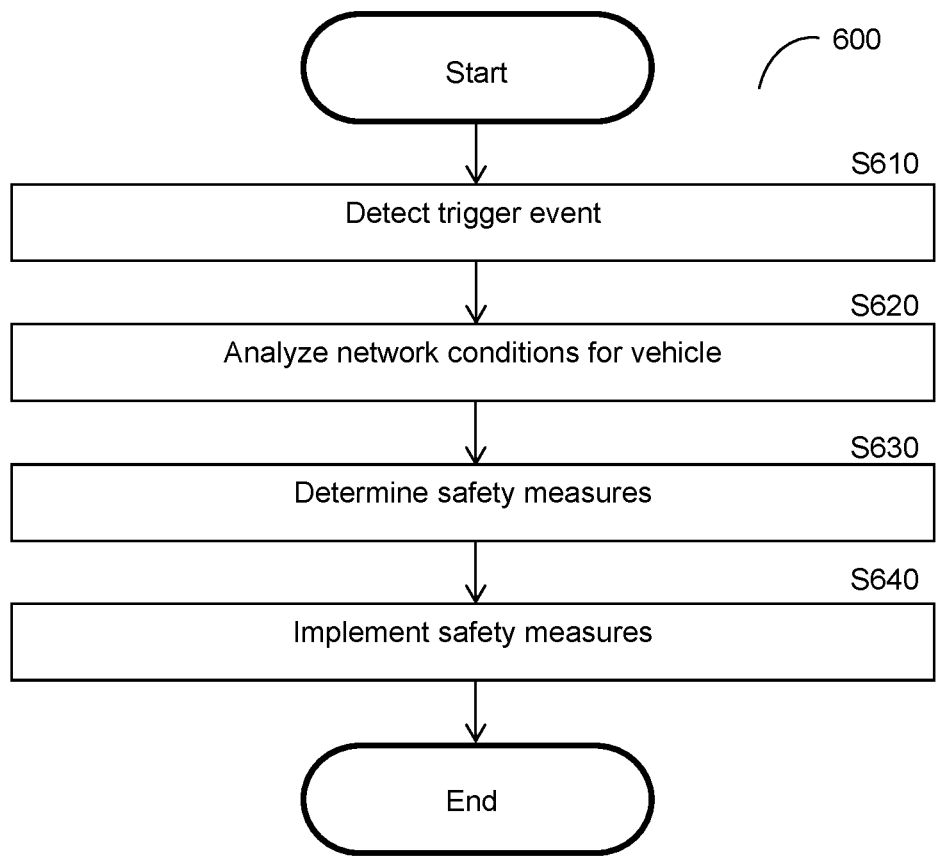
FIG. 6 is a flowchart illustrating a method for reactively maintaining safety of a remotely operated vehicle according to an embodiment.

FIG. 6 is a flowchart 600 illustrating a method for reactively maintaining safety of a remotely operated vehicle according to an embodiment. In an embodiment, the method is performed by the safety manager 130, FIG. 1.

At S610, a trigger event is detected. The trigger event is defined as a set of one or more criteria related to the vehicle which may require adjusting the safety measures (e.g., safety system configuration, settings, policies, specific safety decisions, or a combination thereof) in order to ensure safe driving. In particular, in accordance with various disclosed embodiments, one or more of these criteria relate to network conditions such that the trigger event effectively includes triggering when network conditions might interfere with safe remote operation of the vehicle. Various non-limiting example criteria for trigger events are described further above with respect to FIG. 4.

In some embodiments, the trigger event for the reactive process may be based on criteria related to present events indicating that network conditions have already impacted remote operation activities for the vehicle. Such criteria may include, for example, current network conditions degrading (e.g., one or more network condition parameters dropping below respective thresholds) or triggering of one or more safety systems for the vehicle (e.g., lane assistance system triggered by a lane departure).

At S620, network conditions for a vehicle are analyzed. More specifically, the network conditions for the reactive process may be or may include current network conditions being experienced by the vehicle at a present time. Analyzing the network conditions may include, but is not limited to, identifying or determining values for parameters representing respective predetermined aspects of network condition (e.g., network metrics such as latency, jitter, packet loss, throughput, speed, bandwidth, network availability, packet duplication, error rate round-trip time, combinations thereof, and the like). Such values may be determined based on data received from the vehicle, from the network, from one or more systems communicating with the vehicle (e.g., a remote operator device), a combination thereof, and the like.

At S630, one or more safety measure decisions are determined based on the network conditions. More specifically, the safety measure decisions for the reactive process may include decisions for mitigating problems which may be caused by the current network conditions and which may relate to one or more configurations, setting, policies, or a combination thereof, of a safety system of the vehicle to be used for purposes such as arbitrating between local driving commands and remote operator commands, to alter vehicle behavior or limits in order to proactively mitigate potential dangers, to modify sensitivity of systems utilized by the vehicle for making safety-related decisions, a combination thereof, and the like.

At optional S640, the safety system configuration decisions are implemented. Implementing the safety measure decisions may include, but is not limited to, sending commands, sending instructions, or otherwise sending data indicating settings, configurations, or arbitration policies which the safety system should utilize. Such data may further indicate durations of time, locations, or other information indicating when such settings, configurations, or arbitration policies should be utilized by the safety system.

It should be noted that FIGS. 5 and 6 depict separate processes for proactive and reactive safety measures, but that the proactive and reactive processes may be used in parallel or otherwise in combination without departing from the scope of the disclosure. For example, the proactive and reactive processes may have different trigger events (i.e., defined with respect to different sets of criteria) which may be triggered in the same circumstances, or may have at least some trigger events in common such that both processes may be triggered at the same time or one process may be triggered while the other is already being executed.

Figure 7:
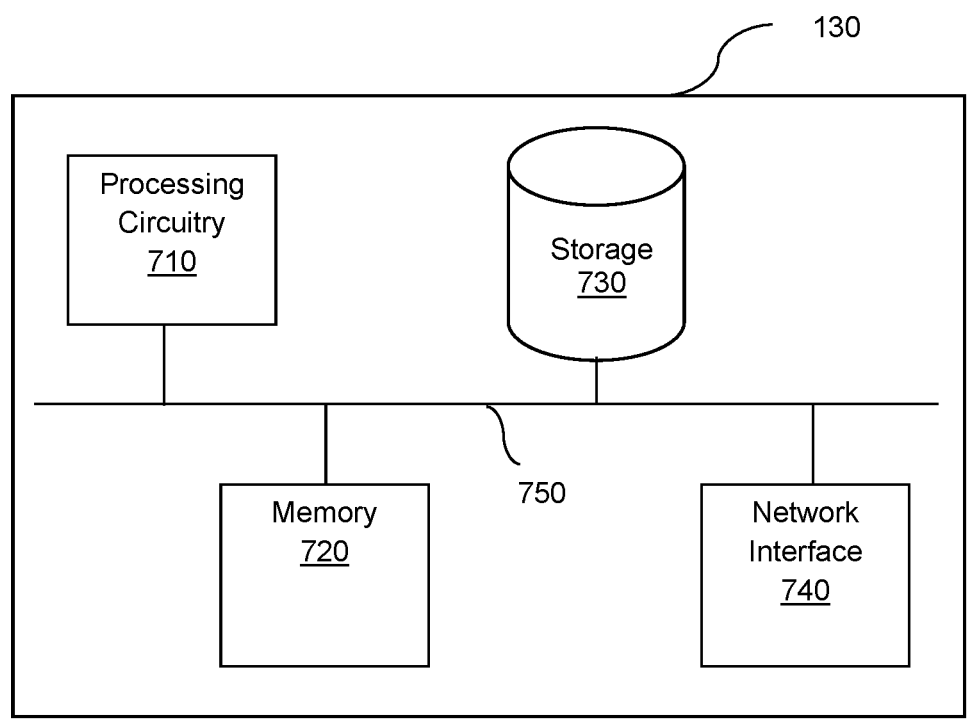
FIG. 7 is a schematic diagram of a safety manager according to an embodiment.

FIG. 7 is an example schematic diagram of a safety manager 130 according to an embodiment. The safety manager 130 includes a processing circuitry 710 coupled to a memory 720, a storage 730, and a network interface 740. In an embodiment, the components of the safety manager 130 may be communicatively connected via a bus 750.

The processing circuitry 710 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 720 may be volatile (e.g., random access memory, etc.), non-volatile (e.g., read only memory, flash memory, etc.), or a combination thereof.

In one configuration, software for implementing one or more embodiments disclosed herein may be stored in the storage 730. In another configuration, the memory 720 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 710, cause the processing circuitry 710 to perform the various processes described herein.

The storage 730 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 740 allows the safety manager 130 to communicate with other systems, devices, components, applications, or other hardware or software components, for example as described herein.

It should be understood that the embodiments described herein are not limited to the specific architecture illustrated in FIG. 7, and other architectures may be equally used without departing from the scope of the disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various embodiments disclosed herein can be implemented as hardware, firmware, software, or any combination thereof. Moreover, the software may be implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for maintaining safe remote vehicle operation, comprising:

analyzing network conditions for a vehicle, wherein at least a portion of vehicle operations for the vehicle are performed based on remote instructions, wherein the remote instructions are sent by a device which is remote from the vehicle;

determining at least one safety measure decision for the vehicle based on the analyzed network conditions, wherein the at least one safety measure decision includes a set of safety measure instructions to be sent to a safety system of the vehicle, wherein the at least one safety measure decision includes a decision on how to arbitrate between remote operation instructions and local operation instructions, wherein the decision on how to arbitrate between the remote operation instructions and the local operation instructions includes ignoring at least a portion of the remote operation instructions; and implementing the at least one safety measure decision with respect to the vehicle by sending the set of safety measure instructions to the safety system of the vehicle, wherein the safety system controls the vehicle operations based on the set of safety measure instructions.

2. The method of claim 1, further comprising:
detecting a trigger event based on the vehicle operations for the vehicle, wherein the network conditions are analyzed when the trigger event has been detected.

3. The method of claim 2, further comprising:
selecting the trigger event based on the at least a portion of the vehicle operations which are performed based on the remote instructions.

4. The method of claim 3, wherein the trigger event is selected based further on an availability of historical network connection data for a location of the vehicle.

5. The method of claim 3, wherein the trigger event is selected based further on a degree of remote operation of the vehicle, wherein the degree of remote operation is determined based on a proportion of the vehicle operations which are performed based on the remote instructions.

6. The method of claim 1, further comprising:
selecting a safety measure policy for the vehicle, wherein the at least one safety measure decision is determined based further on the selected safety measure policy.

7. The method of claim 6, wherein the safety measure policy is a first safety measure policy selected from among a plurality of predetermined safety measure policies.

8. The method of claim 6, wherein the safety measure policy is selected based on a vehicle type of the vehicle.

9. The method of claim 6, wherein the safety measure policy is selected based on available abilities of a remote operator of the vehicle.

10. The method of claim 6, wherein the safety measure policy is selected based on an amount of historical network connection data is available for a location of the vehicle.

11. The method of claim 1, further comprising:
analyzing historical network conditions for an expected future location of the vehicle, wherein the at least one safety measure decision is determined based further on the analysis of the historical network conditions.

12. The method of claim 11, wherein the analyzed historical network conditions is a subset of a set of historical network conditions included in a mapping, wherein the set of mapping maps the set of historical network conditions to a plurality of respective historical locations, wherein analyzing the historical network conditions further comprises analyzing the mapping.

13. The method of claim 1, wherein the at least one safety measure decision includes a sensitivity for each of at least one assisted driving system.

14. A non-transitory computer readable medium having stored thereon instructions for causing a processing circuitry to execute a process, the process comprising:

analyzing network conditions for a vehicle, wherein at least a portion of vehicle operations for the vehicle are performed based on remote instructions, wherein the remote instructions are sent by a device which is remote from the vehicle;

determining at least one safety measure decision for the vehicle based on the analyzed network conditions, wherein the at least one safety measure decision includes a set of safety measure instructions to be sent to a safety system of the vehicle, wherein the at least one safety measure decision includes a decision on how to arbitrate between remote operation instructions and local operation instructions, wherein the decision on how to arbitrate between the remote operation instructions and the local operation instructions includes ignoring at least a portion of the remote operation instructions; and implementing the at least one safety measure decision with respect to the vehicle by sending the set of safety measure instructions to the safety system of the vehicle, wherein the safety system controls the vehicle operations based on the set of safety measure instructions.

15. A system for maintaining safe remote vehicle operation, comprising:
a processing circuitry; and
a memory, the memory containing instructions that, when executed by the processing circuitry, configure the system to:

analyze network conditions for a vehicle, wherein at least a portion of vehicle operations for the vehicle are performed based on remote instructions, wherein the remote instructions are sent by a device which is remote from the vehicle;

determine at least one safety measure decision for the vehicle based on the analyzed network conditions, wherein the at least one safety measure decision includes a set of safety measure instructions to be sent to a safety system of the vehicle, wherein the at least one safety measure decision includes a decision on how to arbitrate between remote operation instructions and local operation instructions, wherein the decision on how to arbitrate between the remote operation instructions and the local operation instructions includes ignoring at least a portion of the remote operation instructions; and implement the at least one safety measure decision with respect to the vehicle by sending the set of safety measure instructions to the safety system of the vehicle, wherein the safety system controls the vehicle operations based on the set of safety measure instructions.

16. The system of claim 15, wherein the system is further configured to:
detect a trigger event based on the vehicle operations for the vehicle, wherein the network conditions are analyzed when the trigger event has been detected.

17. The system of claim 16, wherein the system is further configured to:
select the trigger event based on the at least a portion of the vehicle operations which are performed based on the remote instructions.

18. The system of claim 17, wherein the trigger event is selected based further on an availability of historical network connection data for a location of the vehicle.

19. The system of claim 17, wherein the trigger event is selected based further on a degree of remote operation of the vehicle, wherein the degree of remote operation is determined based on a proportion of the vehicle operations which are performed based on the remote instructions.

20. The system of claim 15, wherein the system is further configured to:
select a safety measure policy for the vehicle, wherein the at least one safety measure decision is determined based further on the selected safety measure policy.

21. The system of claim 20, wherein the safety measure policy is a first safety measure policy selected from among a plurality of predetermined safety measure policies.

22. The system of claim 20, wherein the safety measure policy is selected based on a vehicle type of the vehicle.

23. The system of claim 20, wherein the safety measure policy is selected based on available abilities of a remote operator of the vehicle.

24. The system of claim 20, wherein the safety measure policy is selected based on an amount of historical network connection data is available for a location of the vehicle.

25. The system of claim 15, wherein the system is further configured to:
analyze historical network conditions for an expected future location of the vehicle, wherein the at least one safety measure decision is determined based further on the analysis of the historical network conditions.

26. The system of claim 25, wherein the analyzed historical network conditions is a subset of a set of historical network conditions included in a mapping, wherein the set of mapping maps the set of historical network conditions to a plurality of respective historical locations, wherein analyzing the historical network conditions further comprises analyzing the mapping.

27. The system of claim 15, wherein the at least one safety measure decision includes a sensitivity for each of at least one assisted driving system.

\* \* \* \* \*